US006955762B2

(12) United States Patent
Gallagher et al.

(10) Patent No.: US 6,955,762 B2
(45) Date of Patent: Oct. 18, 2005

(54) METHOD OF CLEANING MEMBRANES

(75) Inventors: Paul Martin Gallagher, Ames, IA (US); Tom Rainier, Baltimore, MD (US); Aaron J. Balczewski, Colorado Springs, CO (US); Daniel A. Cargnel, Baltimore, MD (US)

(73) Assignee: U. S. Filter Wastewater Group, Inc., Warrendale, PA (US)

( * ) Notice: Subject to any disclaimer, the term of this patent is extended or adjusted under 35 U.S.C. 154(b) by 225 days.

(21) Appl. No.: 10/298,471

(22) Filed: Nov. 15, 2002

(65) Prior Publication Data

US 2004/0000520 A1 Jan. 1, 2004

Related U.S. Application Data

(60) Provisional application No. 60/333,828, filed on Nov. 16, 2001.

(51) Int. Cl.$^7$ .............................................. B01D 65/02
(52) U.S. Cl. .......................... 210/636; 95/45; 95/281; 210/639; 210/650; 210/651
(58) Field of Search ............................ 210/636, 639, 210/650, 651, 652, 697, 719, 321.69, 321.84, 321.87, 500.23, 500.42; 95/45, 278; 905/281

(56) References Cited

U.S. PATENT DOCUMENTS

| 3,228,876 A | 1/1966 | Mahon |
| 3,693,406 A | 9/1972 | Tobin |
| 3,968,192 A | 7/1976 | Hoffman et al. |
| 3,992,301 A | 11/1976 | Shippey et al. |
| 4,188,817 A | 2/1980 | Steigelmann |
| 4,192,750 A | 3/1980 | Elfes et al. |
| 4,193,780 A | 3/1980 | Cotton et al. |
| 4,218,324 A | 8/1980 | Hartmann et al. |
| 4,248,648 A | 2/1981 | Kopp |
| 4,384,474 A | 5/1983 | Kowalski |
| 4,385,150 A | 5/1983 | Miyake et al. |
| 4,451,369 A | 5/1984 | Sekino et al. |
| 4,511,471 A | 4/1985 | Müller |
| 4,540,490 A | 9/1985 | Shibata et al. |
| 4,547,289 A | 10/1985 | Okano et al. |
| 4,609,465 A | 9/1986 | Miller |
| 4,614,109 A | 9/1986 | Hofmann |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,718,270 A | 1/1988 | Storr |
| 4,744,240 A | 5/1988 | Reichelt |
| 4,756,875 A | 7/1988 | Tajima et al. |
| 4,763,612 A | 8/1988 | Iwanami |
| 4,767,539 A | 8/1988 | Ford |
| 4,779,448 A | 10/1988 | Gogins |
| 4,784,771 A | 11/1988 | Wathen et al. |
| 4,793,932 A | 12/1988 | Ford et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |

(Continued)

FOREIGN PATENT DOCUMENTS

| DE | 4 117 422 | 11/1992 |
| EP | 126714 | 5/1984 |
| EP | 0 463 627 B1 | 5/1995 |
| EP | 0 763 758 A1 | 10/1996 |
| EP | 1 052 012 A1 | 11/2000 |
| FR | 2 674 448 A1 | 2/1992 |
| GB | 2 253 572 A | 9/1992 |
| JP | 55-129107 | * 10/1980 |
| JP | 58-088007 | 5/1983 |
| JP | 61-097005 | 5/1986 |
| JP | 61-107905 | 5/1986 |
| JP | 61-257203 | 11/1986 |
| JP | 61-263605 | 11/1986 |
| JP | 62-004408 | 1/1987 |
| JP | 62-114609 | 5/1987 |
| JP | 62-140607 | 6/1987 |
| JP | 62-179540 | 8/1987 |
| JP | 63-097634 | 4/1988 |
| JP | 01-307409 | 12/1989 |
| JP | 02-164423 | 6/1990 |
| JP | 02-284035 | 11/1990 |
| JP | 03-018373 | 1/1991 |
| JP | 03-028797 | 2/1991 |
| JP | 31-010445 | 5/1991 |
| JP | 04-310223 | 11/1992 |
| JP | 05-023557 | 2/1993 |
| JP | 05-157654 | 6/1993 |
| JP | 06-071120 | 3/1994 |
| JP | 06-114240 | 4/1994 |
| JP | 07-000770 | 1/1995 |
| JP | 07-275665 | 10/1995 |
| JP | 08-010585 | 1/1996 |
| JP | 09-141063 | 6/1997 |
| JP | 10-156149 | 6/1998 |
| WO | WO 90/00434 | 1/1990 |
| WO | WO 96/41676 | 12/1996 |

OTHER PUBLICATIONS

Almulla et al., Desalination 153 (2002) 237–243.

Rosenberger et al., Desalination 151 (2002) 195–200.

*Primary Examiner*—Joseph Drodge
(74) *Attorney, Agent, or Firm*—Knobbe Martens Olson & Bear LLP

(57) ABSTRACT

The present invention relates a method for cleaning polymeric microfiltration membranes and membrane units, and to compositions useful in such methods. The compositions include at least one soluble sulfite reducing agent and a compatible solvent.

31 Claims, No Drawings

U.S. PATENT DOCUMENTS

| | | |
|---|---|---|
| 4,846,970 A | 7/1989 | Bertelsen et al. |
| 4,876,006 A | 10/1989 | Ohkubo et al. |
| 4,876,012 A | 10/1989 | Kopp et al. |
| 4,921,610 A | 5/1990 | Ford et al. |
| 4,931,186 A | 6/1990 | Ford et al. |
| 4,935,143 A | 6/1990 | Kopp et al. |
| 4,988,444 A * | 1/1991 | Applegate et al. .......... 210/636 |
| 4,999,038 A | 3/1991 | Lundberg |
| 5,005,430 A | 4/1991 | Kibler et al. |
| 5,024,762 A | 6/1991 | Ford et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,076,925 A | 12/1991 | Roesink et al. |
| 5,079,272 A | 1/1992 | Allegrezza et al. |
| 5,094,750 A | 3/1992 | Kopp et al. |
| 5,104,546 A | 4/1992 | Filson et al. |
| H1045 H | 5/1992 | Wilson |
| 5,135,663 A * | 8/1992 | Newberth, III et al. ...... 210/719 |
| 5,137,631 A | 8/1992 | Eckman et al. |
| 5,138,870 A | 8/1992 | Lyssy |
| 5,151,191 A | 9/1992 | Sunaoka et al. |
| 5,151,193 A | 9/1992 | Grobe et al. |
| 5,158,721 A | 10/1992 | Allegrezza et al. |
| 5,192,456 A | 3/1993 | Ishida et al. |
| 5,194,149 A | 3/1993 | Selbie et al. |
| 5,198,116 A | 3/1993 | Comstock et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,297,420 A | 3/1994 | Gilliland et al. |
| 5,320,760 A | 6/1994 | Freund et al. |
| 5,353,630 A | 10/1994 | Soda et al. |
| 5,361,625 A | 11/1994 | Ylvisaker |
| 5,364,527 A | 11/1994 | Zimmermann et al. |
| 5,389,260 A | 2/1995 | Hemp et al. |
| 5,401,401 A | 3/1995 | Hickok et al. |
| 5,403,479 A | 4/1995 | Smith et al. |
| 5,405,528 A | 4/1995 | Selbie et al. |
| 5,417,101 A | 5/1995 | Weich |
| 5,419,816 A | 5/1995 | Sampson et al. |
| 5,470,469 A | 11/1995 | Eckman |
| 5,477,731 A | 12/1995 | Mouton |
| 5,480,553 A | 1/1996 | Yamamori et al. |
| 5,531,848 A | 7/1996 | Brinda et al. |
| 5,531,900 A | 7/1996 | Raghavan et al. |
| 5,543,002 A | 8/1996 | Brinda et al. |
| 5,554,283 A | 9/1996 | Brinda et al. |
| 5,607,593 A | 3/1997 | Cote et al. |
| 5,639,373 A | 6/1997 | Mahendran et al. |
| 5,643,455 A | 7/1997 | Kopp et al. |
| 5,647,988 A * | 7/1997 | Kawanishi et al. ......... 210/636 |
| D396,046 S | 7/1998 | Scheel et al. |
| 5,783,083 A | 7/1998 | Henshaw et al. |
| D396,726 S | 8/1998 | Sadr et al. |
| D400,890 S | 11/1998 | Gambardella |
| 5,888,401 A * | 3/1999 | Nguyen ..................... 210/650 |
| 5,910,250 A | 6/1999 | Mahendran et al. |
| 5,914,039 A | 6/1999 | Mahendran |
| 5,918,264 A | 6/1999 | Drummond et al. |
| 5,942,113 A | 8/1999 | Morimura |
| 5,944,997 A | 8/1999 | Pedersen et al. |
| 6,024,872 A | 2/2000 | Mahendran |
| 6,039,872 A | 3/2000 | Wu et al. |
| 6,042,677 A | 3/2000 | Mahendran et al. |
| 6,048,454 A | 4/2000 | Jenkins |
| 6,077,435 A | 6/2000 | Beck et al. |
| 6,083,393 A | 7/2000 | Wu et al. |
| 6,146,747 A | 11/2000 | Wang et al. |
| 6,156,200 A | 12/2000 | Zha et al. |
| 6,159,373 A | 12/2000 | Beck et al. |
| 6,193,890 B1 | 2/2001 | Pedersen et al. |
| 6,202,475 B1 | 3/2001 | Selbie et al. |
| 6,254,773 B1 | 7/2001 | Biltoft |
| 6,294,039 B1 | 9/2001 | Mahendran et al. |
| RE37,549 E | 2/2002 | Mahendran et al. |
| 6,354,444 B1 | 3/2002 | Mahendran |
| 6,440,303 B2 | 8/2002 | Spriegel |
| D462,699 S | 9/2002 | Johnson et al. |
| 6,524,481 B2 | 2/2003 | Zha et al. |
| 6,555,005 B1 | 4/2003 | Zha et al. |
| D478,913 S | 8/2003 | Johnson et al. |
| 6,620,319 B2 | 9/2003 | Behmann et al. |
| 6,641,733 B2 | 11/2003 | Zha et al. |
| 6,685,832 B2 | 2/2004 | Mahendran et al. |
| 6,783,008 B2 | 8/2004 | Zha et al. |
| 6,821,420 B2 | 11/2004 | Zha et al. |
| 2002/0148767 A1 | 10/2002 | Johnson et al. |
| 2002/0195390 A1 | 12/2002 | Zha et al. |
| 2003/0057155 A1 * | 3/2003 | Husain et al. |
| 2003/0075504 A1 | 4/2003 | Zha et al. |
| 2003/0089659 A1 | 5/2003 | Zha et al. |
| 2003/0136746 A1 | 7/2003 | Behman et al. |
| 2003/0178365 A1 | 9/2003 | Zha et al. |
| 2003/0205519 A1 | 11/2003 | Zha et al. |
| 2003/0226797 A1 | 12/2003 | Phelps |
| 2003/0234221 A1 | 12/2003 | Johnson et al. |
| 2004/0000520 A1 | 1/2004 | Gallagher et al. |
| 2004/0035782 A1 | 2/2004 | Muller |

* cited by examiner

METHOD OF CLEANING MEMBRANES

RELATED APPLICATION

This application claims the benefit of U.S. Provisional Application No. 60/333,828, filed Nov. 16, 2001.

FIELD OF THE INVENTION

The present invention relates a method for cleaning polymeric microfiltration membranes and membrane units, and to compositions useful in such methods.

BACKGROUND OF THE INVENTION

Synthetic membranes are used for a variety of applications including desalination, gas separation, filtration, and dialysis. The properties of the membranes vary depending on the morphology of the membrane, i.e. properties such as symmetry, pore shape, and pore size, and the polymeric material used to form the membrane.

Different membranes can be used for specific separation processes, including microfiltration (MF), ultrafiltration (UF), and reverse osmosis. MF and UF processes are carried out under differential pressure and are distinguished by the size of the particle or molecule that the membrane is capable of retaining or passing. MF can remove very fine colloidal particles in the micrometer and sub micrometer range. As a general rule, it can filter particles down to 0.1 $\mu$m, whereas ultrafiltration can retain particles as small as 0.01 $\mu$m and smaller. Reverse osmosis operates on an even smaller scale.

As the size of the particles to be separated decreases, the pore size of the membrane decreases and the pressure required to carry out the separation accordingly increases.

A large surface area is generally needed when a large filtrate flow is required. One known technique to make a filtration apparatus more compact is to form a membrane in the shape of a hollow porous fiber. Modules of such fibers can be made with an extremely large surface area per unit volume. Microporous synthetic membranes are particularly suitable for use in hollow fibers and are typically produced by phase inversion techniques.

Microporous phase inversion membranes are particularly well suited to the application of removal of colloidal suspensions, viruses, and bacteria. Of all types of membranes, the hollow fiber membrane contains the largest membrane area per unit volume.

UF and MF membranes are used in separating particles and colloidal matter from liquids. In a typical scenario, water containing solutes and precipitates is passed through a bank of semipermeable tubular membranes housed in a module, often at elevated pressures. The filtered water is drawn off and collected, leaving a residue of solid material in the membrane pores or on the unfiltered side of the membrane.

It is preferred that the pores of the membrane be kept relatively free of contaminants. As the amount of pore blockage increases, the filtration efficiency of the module decreases and the amount of pressure required to maintain a viable throughput of liquid increases. As pressure increases, the likelihood of membrane rupture becomes more significant.

Under some circumstances, it may be desirable to treat water containing impurities with a flocculating agent prior to filtration. The purpose of flocculating agents is to cause dispersed colloids to coagulate and form 'flocs'. Flocs have the advantage of entrapping smaller colloidal particles, thereby making filtration more efficient. They may also aid in the removal of dissolved particles. Under the influence of a flocculating agent, dissolved and suspended particles coagulate and precipitate from the water, thereby removing color, and turbidity.

Thus, in practice, the filtrate containing the flocculating agents, colloids, bacteria and other particulate matter is passed through the filtration unit under pressure, expelling filtered water and leaving the floc trapped within the unit, and more particularly on the waste side of the membrane and in the pores of the membrane. Flocs are particularly problematical in causing membrane blockage, and membrane performance gradually diminishes with use until it becomes necessary to clean the membranes.

One of the most commonly employed flocculating agents in the water purification field is ferric chloride, and the resultant floc is known as Fe floc. Build-up of Fe floc leads to iron fouling and eventually results in membrane performance degradation that diminishes the lifetime of these high cost membrane units. Two of the most widely used membrane compositions, polypropylene (PP) and polyvinylidene fluoride (PVDF), foul irreversibly with Fe floc and can become useless.

Residual material accumulating in and on the membrane is often removed by 'backwashing', that is, running the current of water counter to its normal direction of flow to dislodge the contaminants from the membrane. Gas backwashing of the membrane is also possible.

Backwashing generally involves increasing the pressure on both sides of the hollow fibers within a module a relatively high value before suddenly releasing that pressure on the unfiltered side of the membrane walls to cause a sudden pressure differential across the walls, which causes a backwash action. However, it is difficult to achieve complete removal of particulate matter, especially when flocculants have been used.

In addition to backwashing, the membranes may be de-fouled by more conventional cleaning regimes such as solution treatment with one or more of (and usually in a sequential manner) citric acid, oxidizing agents, in particular chlorine, and chelating agents such as EDTA.

Citric acid is usually regarded as a satisfactory cleaning agent, however, even it does not provide ideal levels of cleaning, and the membrane performance diminishes even following regular use/cleaning cycles. Moreover, the cleaning process usually involves a number of steps, and one or more of the steps may need to be conducted for long periods of time. Temperature control is also usually required.

Inorganic acids and bases are the mainstay of conventional cleaning agents. As well as suffering from the drawbacks mentioned above, these agents present their own problems because they may chemically attack the membranes and/or module components. Combinations of an aqueous inorganic acid, generally nitric acid, and a reducing agent, e.g., ascorbic acid, have also been used. However, none of the above regimes sufficiently de-foul membranes, particularly PVDF membranes, of the floc. Hence, there exists the need to improve the cleaning regime while at the same time avoiding the use of potentially severe cleaning agents.

SUMMARY OF THE INVENTION

It is desirable to overcome or ameliorate at least one of the disadvantages of the prior art methods of de-fouling membranes, to provide a useful alternative to conventional methods of de-fouling membranes, or to provide suitable compositions for use in cleaning or de-fouling membranes.

In a preferred embodiment, there is provided a method of cleaning a membrane contaminated with a contaminant including the step of contacting the contaminant with a composition including at least one soluble sulfite reducing agent and a compatible solvent. The term sulfite as used herein is used in its broadest general sense and includes, without limitation, sulfite, bisulfite, metabisulfite, hydrosulfite, and the like.

Preferably the membrane is of a hollow fiber configuration, although alternatively it may be a flat sheet membrane or other membrane configuration. In highly preferred embodiments, the membrane is formed from PVDF (polyvinylidene fluoride) polymer, although the methods of the preferred embodiments are applicable to polysulfone, polyethylene, polypropylene, polyacrylonitrile (PAN), fluorinated membranes, cellulose acetate membranes and the like and mixtures of the above, as well as all commonly used membrane polymers.

Preferably, the soluble sulfite reducing agent is sodium metabisulfite, sodium hydrosulfite, sodium sulfite or mixtures thereof. Most preferably, a mixture of sodium metabisulfite and sodium hydrosulfite is used. Those skilled in the art will appreciate that, for instance, besides sodium, other soluble salts such as potassium or other alkali metals or alkaline earth metals may be used. The solvent is preferably water. However any suitable solvent that is compatible with the materials comprising the membrane and is a suitable solvent for the sulfite may also be employed.

It is also preferred that the sodium metabisulfite and sodium hydrosulfite are present in an amount of 20 wt. % to 65 wt. % each, when used alone or in combination. This combination may be used neat or further diluted when in use, for example, to around 0.5 wt. %. Dilutions of about 2 wt. % are particularly preferred. However, any suitable dilution may be employed.

Preferably, and without wishing to be bound by any particular theory, the contaminant is believed to be removed by solubilization resulting from a reduction to a lower valence state of at least a part of the contaminant.

Preferably, the method reduces the cleaning time relative to known cleaning methods and is carried out at low or ambient temperatures.

Accordingly, in a first embodiment, a method of cleaning a membrane contaminated with a contaminant is provided, the method including the step of contacting the contaminant with a composition including a sulfite reducing agent and a solvent, wherein the sulfite reducing agent is soluble in the solvent, and wherein the solvent is compatible with the membrane.

In an aspect of the first embodiment, the contaminant includes a metal oxide or a metal hydroxide.

In an aspect of the first embodiment, the contaminant includes ferric floc.

In an aspect of the first embodiment, the contaminant includes an organic compound.

In an aspect of the first embodiment, the solvent includes water.

In an aspect of the first embodiment, the sulfite reducing agent includes sodium metabisulfite, sodium hydrosulfite, sodium sulfite, potassium metabisulfite, potassium hydrosulfite, potassium sulfite, or mixtures thereof.

In an aspect of the first embodiment, method further includes the step of reducing a valence state of an atom of the contaminant to a lower valence state, whereby the contaminant is solublized and removed from the membrane.

In an aspect of the first embodiment, the composition further includes an enhancing agent.

In an aspect of the first embodiment, the enhancing agent includes inorganic acids, organic acids, or mixtures thereof.

In an aspect of the first embodiment, the enhancing agent includes citric acid.

In an aspect of the first embodiment, the solvent includes water and the sulfite reducing agent includes sodium metabisulfite, sodium hydrosulfite, or mixtures thereof In an aspect of the first embodiment, the sulfite reducing agent includes from about 0.1 wt. % to about 5 wt. % of a component including sodium metabisulfite, sodium hydrosulfite, or mixtures thereof.

In an aspect of the first embodiment, the sulfite reducing agent includes from about 0.5 wt. % to about 2 wt. % of a component including sodium metabisulfite, sodium hydrosulfite, or mixtures thereof.

In an aspect of the first embodiment, the composition includes from about 0.5 wt. % to about 1.5 wt. % sodium metabisulfite and from about 0.5 wt. % to about 1.5 wt. % sodium hydrosulfite.

In an aspect of the first embodiment, the membrane includes a hollow fiber microfiltration membrane or a hollow fiber ultrafiltration membrane.

In an aspect of the first embodiment, the membrane includes a flat microfiltration membrane or a flat ultrafiltration membrane.

In an aspect of the first embodiment, the membrane includes a polyvinylidene fluoride polymer.

In a second embodiment, a composition for cleaning a membrane contaminated with a contaminant is provided, the composition including a sulfite reducing agent and a solvent, wherein the sulfite reducing agent is soluble in the solvent, and wherein the solvent is compatible with the membrane.

In an aspect of the second embodiment, the contaminant includes a metal oxide or a metal hydroxide.

In an aspect of the second embodiment, the contaminant is ferric floc.

In an aspect of the second embodiment, the sulfite reducing agent includes sodium metabisulfite, sodium hydrosulfite, sodium sulfite, potassium metabisulfite, potassium hydrosulfite, potassium sulfite, or mixtures thereof.

In an aspect of the second embodiment, the sulfite reducing agent includes sodium metabisulfite and sodium hydrosulfite.

In an aspect of the second embodiment, the composition further includes an enhancing agent.

In an aspect of the second embodiment, the enhancing agent includes an inorganic acid or an organic acid.

In an aspect of the second embodiment, the organic acid includes citric acid.

In an aspect of the second embodiment, the sulfite reducing agent includes from about 20 wt. % to about 60 wt. % sodium metabisulfite, wherein the sulfite reducing agent is capable of dilution to a working concentration of about 0.5 wt. % to about 2 wt. % of sulfite reducing agent in a solubilized form.

In an aspect of the second embodiment, the sulfite reducing agent includes from about 0.5 wt. % to about 2 wt. % sodium metabisulfite.

In an aspect of the second embodiment, the sulfite reducing agent includes from about 20 wt. % to about 65 wt. % sodium hydrosulfite, and wherein the sulfite reducing agent is capable of dilution to a working concentration of about 0.5 wt. % to about 2 wt. % soluble sulfite reducing agent present in solubilized form.

In an aspect of the second embodiment, the sulfite reducing agent includes from about 0.5 wt. % to about 2 wt. % sodium hydrosulfite.

In an aspect of the second embodiment, the composition includes from about 20 wt. % to about 65 wt. % sodium metabisulfite and from about 20 wt. % to about 65 wt. % sodium hydrosulfite, wherein the sodium metabisulfite and sodium hydrosulfite are capable of dilution to a working concentration of about 0.5 wt. % to about 2 wt. % sulfite reducing agent in solubilized form.

In an aspect of the second embodiment, the composition includes from about 0.5 wt. % to about 2 wt. % sodium metabisulfite and sodium hydrosulfite.

In a third embodiment, a method for cleaning a membrane is provided, the method including the step of cleaning the membrane using a composition including a sulfite reducing agent and a solvent, wherein the sulfite reducing agent is soluble in the solvent, and wherein the solvent is compatible with the membrane.

In a fourth embodiment, a membrane is provided wherein the membrane is capable of cleaning by a composition including a sulfite reducing agent and a solvent, wherein the sulfite reducing agent is soluble in the solvent, and wherein the solvent is compatible with the membrane.

In a fifth embodiment, a membrane is provided, wherein the membrane is contaminated with a contaminant including a metal oxide or a metal hydroxide, and wherein the membrane is capable of cleaning by a composition including a sulfite reducing agent and a solvent, wherein the sulfite reducing agent is soluble in the solvent, and wherein the solvent is compatible with the membrane.

In an aspect of the fifth embodiment, the membrane includes a hollow fiber or a flat sheet.

In an aspect of the fifth embodiment, the membrane includes a polyvinylidene fluoride polymer.

DETAILED DESCRIPTION OF THE PREFERRED EMBODIMENTS

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Ferric chloride is the preferred flocculating agent in water clean-up procedures. However, standard cleaning regimes have not been highly effective in cleaning PVDF membranes of the resultant Fe floc, leading to significant commercial costs associated with ultimate irreversible membrane fouling by metal oxides and/or hydroxides.

Surprisingly, the present inventors have found that the methods of the preferred embodiments are particularly suited for PVDF membranes. When metabisulfite was used as a cleaning agent on PVDF membranes, there was successful removal of metal oxides and metal hydroxides.

More surprisingly, when sodium hydrosulfite and sodium metabisulfite were used in combination as cleaning agents for PVDF membranes, significant antifouling properties were observed.

One commercial blend of sodium hydrosulfite (20–65 wt. %) and sodium metabisulfite (20–65 wt. %) was found to be particularly useful. This mixture, marketed as SUPER IRON OUT®, has been commercially available since the 1950's, although it has not been used for cleaning membranes. SUPER IRON OUT® has been marketed to household consumers as an all-purpose rust and stain remover, water softener, a cleaning agent for toilets, sinks tubs, dishwashers, white clothing, and fabrics as well as exterior surfaces, i.e. as a general household reductant.

This material may be used neat, although it is possible to use it diluted in an amount such that the dilution is as low as 0.5 wt. %, although dilutions of around 2 wt. % have been found advantageous.

Alternatively, standardized solutions may be prepared from the starting materials. While the exact concentration will be selected depending on the time limits set for the membrane cleaning and on cost considerations, it has been found particularly useful to use solutions of around 2 wt. % volume total sulfite content based on the starting materials, i.e. 2 g sodium metabisulfite per 100 ml of water, or 1 g sodium bisulfite and 1 g of sodium hydrosulfite per 100 ml of water, and the like.

The commercial importance of this new application is that it allows ferric floc applications to be run at 20 to 30% higher water flux than has previously been thought possible. Using such high fluxes is normally to be avoided because of the extreme fouling that takes place under such conditions, and the resultant difficulty in cleaning badly fouled membranes, wherein the floc is forced hard into the pores and cannot be readily physically removed by backwashing, or by chemical cleaners.

With the advent of the cleaning method of the preferred embodiments, the ferric floc applications can be run at the higher flux and the fouled membranes can be quickly and efficiently cleaned. The ability to use such high fluxes can translate into a significant commercial advantage.

As more liquid is filtered, the amount of residue removed from that liquid increases in the pores and on the outside and needs to be cleaned.

The methods of the preferred embodiments can be used in conjunction with backwashing methodology, or as a stand-alone cleaning method suitable for carrying out "cleaning-in-place" (CIP). CIP involves cleaning the membrane module without removal from its normal in situ place of operation.

In general terms, one form of CIP cleaning involves isolating the module to be cleaned by means of taps and pipes and the like from fluid communication with the remainder of the system. The water or liquid normally filtered is then replaced with a cleaning fluid. The cleaning fluid is then allowed to run through the membrane module to carry out the cleaning. The cleaning fluid may be recycled through the module, or allowed to pass through the module just once before being run off to waste, depending upon the particular requirements of the system and the amount of contaminants being removed.

The CIP procedure can take place at ambient temperatures or at controlled temperatures outside the normal range of filtration temperatures, e.g. at higher temperatures to increase dissolution of solids, or at lower temperatures to allow for a greater concentration of dissolved gaseous agents e.g., especially chlorine gas, in the fluid. The CIP can be carried out for varying lengths of time and at pressures outside the normal range of those used for filtration.

Once the cleaning is completed, the filtration agent is flushed to remove traces of the cleaning agent before being returned to service by being reconnected to the normal fluid flow.

CIP can be carried out manually or by means of fully automated systems which activate in response to pressure differentials or after predetermined module operating times.

A preferred embodiment is described below, by way of example only.

The examples given below relate to modules prepared from banks of hollow fiber PVDF membranes. The membrane modules are as described in U.S. Pat. No. 6,159,373, the contents of which are incorporated herein by reference. The module includes a shell within which is positioned a bundle containing from about 2800 to about 30,000 hollow fibers with a diameter of 500 $\mu$m to 650 $\mu$m and a lumen diameter of 250 $\mu$m to 310 $\mu$m, with a pore size of 0.2 $\mu$m, but these sizes may be varied as required. Moreover, membrane and module configurations different from the one described above may also be employed with the methods of preferred embodiments, as will be appreciated by one skilled in the art.

At each end of the fiber bundle, a potting compound holds the ends of the fibers in place without blocking the lumens and closes off each end of the module. The liquid feed is pumped into the module, between the shell and the outside of the hollow fibers. Some of the feed liquid passes into the lumen of the fibers, being filtered as it does so. The clean liquid then concentrates in the inside of the lumen, and flows, or is drawn off and taken outside the module, as a clarified liquid.

In the CIP method exemplified, the cleaning agent is introduced in place of the untreated liquid stream. However, those skilled in the art will realize that the flow can be introduced counter to that normally used.

EXAMPLES

CIP Comparative Method 1—Raw Water Filtration Module

Membranes in a raw water filtration module were cleaned using a 2 wt. % solution of citric acid in water at 35° C., which was recirculated for 60 minutes. Three repeats of a 300 second aeration followed by a 300 second soak were conducted. Then, a solution of 300 ppm Cl in water at 20° C. was recirculated for 60 minutes, followed by a 30 minute soak. The total duration of the CIP was 3 hours. Table 1 provides measurements of transmembrane pressure (TMP), resistance (R), and flow (in gallons per minute per module) both before and after the CIP.

TABLE 1

| BEFORE CIP | | | AFTER CIP | | |
|---|---|---|---|---|---|
| TMP (psi) | R | Flow (gpm/mod) | TMP (psi) | R | Flow (gpm/mod) |
| 8.1 | 4.27 | 4.4 | 3.5 | 2.21 | 4.9 |

CIP Comparative Method 2—Clarified Water Filtration Module

Membranes in a clarified water filtration module (containing flocculant) were cleaned 400 ppm solution of Cl in water at 20° C., which was recirculated for 60 minutes, followed by a 30 minute soak. Then the membranes were washed with a 2.7 wt. % citric acid solution in water at 35° C., which was recirculated for 60 minutes. Three repeats of a 300 second aeration followed by a 300 second soak were conducted. Then, an overnight soak was conducted. The total duration of the CIP was 13 hours. Table 2 provides measurements of transmembrane pressure, resistance, and flow both before and after the CIP.

TABLE 2

| BEFORE CIP | | | AFTER CIP | | |
|---|---|---|---|---|---|
| TMP (psi) | R | Flow (gpm/mod) | TMP (psi) | R | Flow (gpm/mod) |
| 11 | 7.48 | 4.9 | 5.9 | 3.56 | 4.9 |

CIP Comparative Method 3—Clarified Water Filtration Module

Membranes in a clarified water filtration module (containing flocculant) were cleaned using a 1000 ppm solution of Cl in water at 20° C., which was recirculated for 60 minutes, followed by a 30 minute soak. Then the membranes were washed with a 4 wt. % citric acid solution in water at 35° C., which was recirculated for 60 minutes. Three repeats of a 300 second aeration followed by a 300 second soak were conducted. Then, an overnight soak in a 1000 ppm Cl solution in water was conducted. The total duration of the CIP was 13 hours. Table 3 provides measurements of transmembrane pressure, resistance, and flow both before and after the CIP.

TABLE 3

| BEFORE CIP | | | AFTER CIP | | |
|---|---|---|---|---|---|
| TMP (psi) | R | Flow (gpm/mod) | TMP (psi) | R | Flow (gpm/mod) |
| 10.9 | 10.61 | 3.6 | 5.4 | 3.34 | 3.6 |

CIP Comparative Method 4—Raw Water Filtration Module

Membranes in a raw water filtration module were cleaned using a solution of 300 ppm Cl in water at 20° C., followed by an overnight soak. Then, the membranes were cleaned with a 2 wt. % citric acid solution in water at 40° C. for two hours. The total duration of the CIP was 13 hours. Table 4 provides measurements of transmembrane pressure (TMP), resistance (R), and flow (in gallons per minute per module) both before and after the CIP.

TABLE 4

| BEFORE CIP | | | AFTER CIP | | |
|---|---|---|---|---|---|
| TMP (psi) | R | Flow (gpm/mod) | TMP (psi) | R | Flow (gpm/mod) |
| 5.58 | 4.08 | 3.85 | 3.5 | 2.63 | 3.75 |

CIP Method 1—Clarified Water Filtration Module

Membranes in a clarified water filtration module (containing flocculant) were cleaned using a 2 wt. % solution of SUPER IRON OUT® in water at 20° C. for 30 minutes. Then the membranes were washed with a solution of 1000 ppm Cl in water at 20° C., which was recirculated for 60 minutes, followed by a 30 minute soak. The total duration of the CIP was 2 hours. Table 5 provides measurements of transmembrane pressure, resistance, and flow both before and after the CIP. The data demonstrate a substantial reduction in transmembrane pressure and resistance, and an increase in flow following the cleaning method.

TABLE 5

| BEFORE CIP | | | AFTER CIP | | |
|---|---|---|---|---|---|
| TMP (psi) | R | Flow (gpm/mod) | TMP (psi) | R | Flow (gpm/mod) |
| 10.6 | 7.19 | 4.8 | 5 | 2.8 | 5.7 |

It can be seen from all the above examples that cleaning the membranes, by both conventional methods and by the methods of the preferred embodiments, results in a reduction in transmembrane pressure, a decrease in resistance, and an increase in flow, all indicators that the membrane has been cleaned.

The results with SUPER IRON OUT® are significantly better than the comparative conventional methods. It enables the highest restoration of flow and the most significant decrease in resistance on cleaning.

It has also achieved these results at ambient temperatures, and with fewer steps, meaning that the amount of external apparatus required to carry out the CIP of the module is considerably reduced.

Possibly most significantly, however, it achieved this high level of cleaning in 2 hours for clarified (flocculant-containing) water. To achieve close to this result using the standard methods required overnight CIP times, typically around 13 hours. This dramatic reduction in CIP time translates into a reduction in downtime of modules, as well as allowing higher liquid throughput by permitting effective clean up after running at high flux rates.

Sulfite agents such as sodium metabisulfite and SUPER IRON OUT® can also be used in conjunction with other conventional methods, for example, in conjunction with sulfuric acid for cleaning membranes (including polypropylene membranes). In low concentrations, it is believed sodium metabisulfite may act as a sacrificial agent, protecting the membrane from degradation by other cleaning agents.

Further investigations were carried out to better standardize the active amount of sulfite agent present (rather than relying on the broader ranges which may be found in proprietary formulations and to investigate the optimal cleaning compositions, as established by the differing criteria to determine membrane de-fouling.

Two sets of experiments were carried out to determine the efficiency of sulfite cleaning compositions of precisely defined composition relative to citric acid and chlorine, and measured with reference to different criteria. In both sets of experiments, the membranes were fouled with a mixture of 100 ppm humic acid and 100 ppm $FeCl_3 \cdot 6H_2O$, by filtering this mixture through the membranes.

In the transmembrane pressure recovery and refouling experiments, the same equipment was used to filter the cleaning solution through the membranes. The TMP change versus time was recorded while filtering this humic acid/iron solution through the membrane before and after the clean. The results are shown in Table 6.

TABLE 6

| Clean | Final TMP before clean (kPa) | Initial TMP after clean (kPa) | TMP recovery (kPa) | Fouling rate post-clean (kPa/min) |
|---|---|---|---|---|
| 2 wt. % Citric acid | 38 | 18 | 20 | 0.07 |
| 200 ppm NaOCl | 46 | 21 | 25 | 0.6 |
| 2 wt. % SHS | 60 | 21 | 39 | 0.15 |
| 2 wt. % SMBS | 36 | 20 | 16 | 0.08 |
| 1.5 wt. % SMBS + 0.5 wt. % SHS | 31 | 17 | 14 | 0.1 |
| 0.5 wt. % SMBS + 1.5 wt. % SHS | 39 | 20 | 19 | 0.1 |
| 1 wt. % SMBS + 1 wt. % SHS | 36 | 20 | 16 | 0.3 |

SMBS = sodium metabisulfite
SHS = sodium hydrosulfite

The results in the experiment show that the TMP recoveries were similar for all the cleaning methodologies used except for 2 wt. % sodium hydrosulfite which gave a significantly higher recovery than the other cleaning agents.

The best post-clean fouling rates were also investigated. The poorest post-clean fouling rate was found using the conventional chlorine clean. The best post clean fouling was found using 2 wt. % citric acid and 2 wt. % SMBS, with the 1.5 wt. % SMBS/0.5 wt. % SHS and 0.5 wt. % SMBS/1.5 wt. % SHS mixtures also performing very well.

In the second set of experiments, the dirty membranes were placed in jars of the cleaning solution and allowed to soak. The permeability of the fibers was measured before and after the clean. The results are shown in Table 7.

TABLE 7

| Clean | Permeability before clean ($L/m^2 \cdot$ hour) | Permeability after clean ($L/m^2 \cdot$ hour) | Permeability recovery ($L/m^2 \cdot$ hour) | % Permeability recovery |
|---|---|---|---|---|
| 2 wt. % Citric acid | 589 | 795 | 206 | 135 |
| 200 ppm NaOCl | 277 | 576 | 299 | 207 |
| 2 wt. % SHS | 383 | 795 | 412 | 208 |
| 2 wt. % SMBS | 454 | 714 | 260 | 157 |
| 1.5 wt. % SMBS + 0.5 wt. % SHS | 350 | 774 | 424 | 221 |
| 0.5 wt. % SMBS + 1.5 wt. % SHS | 591 | 835 | 244 | 141 |
| 1 wt. % SMBS + 1 wt. % SHS | 378 | 824 | 446 | 236 |

SMBS = sodium metabisulfite
SHS = sodium hydrosulfite

The citric acid gave the lowest permeability recovery. Three cleans, 1.5% SMBS+0.5 wt. % SHS, 1 wt. % SMBS+1 wt. % SHS, and 2 wt. % SHS gave the best permeability recoveries. The permeability recoveries for the sulfite cleaning agents show that for two specific combinations, 1.5 wt. % SMBS/0.5 wt. % SHS and 1 wt. % SMBS/1 wt. % SHS, the permeability recovery (of 221% and 236%, respectively) was greater than the permeability recovery for either the SMBS or SHS alone, indicating a synergistic relationship between the two. On the basis of the individual mixture components, a 1 wt. %: 1 wt. % SMBS/SHS mixture would be expected to restore about 183% (based on 208%/2+157%/2) of the permeability, yet the actual value was 236%.

The other cleaning combinations are likewise not simply additive, indicating that in combination, the two sulfite cleaning agents may act co-operatively.

Thus, it can be seen that the sulfite cleaning method of the preferred embodiments provided in all cases a good TMP recovery, good permeability recovery and a low rate of post clean fouling. The all round performance was not matched by conventional cleaning methodologies. Further, sulfite cleaning required less time to achieve CIP (cleaning in place) de-fouling of membranes than conventional (chlorine) membrane cleans.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. All patents, applications, and other references cited herein are hereby incorporated by reference in their entirety.

What is claimed is:

1. A method of cleaning a porous polymeric membrane contaminated with a contaminant comprising ferric floc, the method comprising the step of:
    contacting the contaminant with a composition comprising a sulfite reducing agent, and a solvent, wherein the sulfite reducing agent is soluble in the solvent, and wherein the solvent is compatible with the porous polymeric membrane.

2. The method according to claim 1, wherein the contaminant comprises an organic compound.

3. The method according to claim 1, wherein the solvent comprises water.

4. The method according to claim 1, wherein the sulfite reducing agent is selected from the group consisting of sodium metabisulfite, sodium hydrosulfite, sodium sulfite, potassium metabisulfite, potassium hydrosulfite, potassium sulfite, and mixtures thereof.

5. The method according to claim 1, further comprising the step of:
    reducing a valence state of an atom of the contaminant to a lower valence state, whereby the contaminant is solublized and removed from the membrane.

6. The method according to claim 1, wherein the enhancing agent is selected from the group consisting of inorganic acids, organic acids, and mixtures thereof.

7. The method according to claim 1, wherein the enhancing agent comprises citric acid.

8. A method of cleaning a porous polymeric membrane contaminated with a contaminant, the method comprising the step of:
    contacting the contaminant with a composition comprising a sulfite reducing agent and a solvent, wherein the sulfite reducing agent is soluble in the solvent, and wherein the solvent is compatible with the porous polymeric membrane, wherein the solvent comprises water and the sulfite reducing agent comprises sodium metabisulfite and sodium hydrosulfite.

9. The method according to claim 8, wherein the sulfite reducing agent comprises from about 0.1 wt. % to about 5 wt. % of a component selected from the group consisting of sodium metabisulfite, sodium hydrosulfite, and mixtures thereof.

10. The method according to claim 8, wherein the sulfite reducing agent comprises from about 0.5 wt. % to about 2 wt. % of a component selected from the group consisting of sodium metabisulfite, sodium hydrosulfite, and mixtures thereof.

11. A method according to claim 8, wherein the composition comprises from about 0.5 wt. % to about 1.5 wt. % sodium metabisulfite and from about 0.5 wt. % to about 1.5 wt. % sodium hydrosulfite.

12. The method according to claim 8, wherein the membrane comprises a hollow fiber microfiltration membrane or a hollow fiber ultrafiltration membrane.

13. The method according to claim 8, wherein the membrane comprises a flat microfiltration membrane or a flat ultrafiltration membrane.

14. The method according to claim 8, wherein the membrane comprises a polyvinylidene fluoride polymer.

15. A composition for cleaning a porous polymeric membrane contaminated with a contaminant, the composition comprising a sulfite reducing agent, an enhancing agent, and a solvent, wherein the sulfite reducing agent is soluble in the solvent, wherein the sulfite reducing agent comprises sodium metabisulfite and sodium hydrosulfite, and wherein the solvent is compatible with the membrane.

16. The composition according to claim 15, wherein the contaminant comprises a metal oxide or a metal hydroxide.

17. The composition according to claim 15, wherein the contaminant is ferric floc.

18. The composition according to claim 15, wherein the enhancing agent comprises an inorganic acid or an organic acid.

19. The composition according to claim 18, wherein the organic acid comprises citric acid.

20. A composition for cleaning a porous polymeric membrane contaminated with a contaminant, the composition comprising a sulfite reducing agent, an enhancing agent, and a solvent, wherein the sulfite reducing agent is soluble in the solvent, wherein the sulfite reducing agent comprises sodium metabisulfite and sodium hydrosulfite, wherein the solvent is compatible with the membrane, wherein the composition comprises from about 20 wt. % to about 65 wt. % sodium metabisulfite and about 20 wt. % to about 65 wt. % sodium hydrosulfite.

21. The composition according to claim 20, wherein the contaminant comprises a metal oxide or a metal hydroxide.

22. The composition according to claim 20, wherein the contaminant is ferric floc.

23. The composition according to claim 20, further comprising an enhancing agent.

24. The composition according to claim 23, wherein the enhancing agent comprises an inorganic acid or an organic acid.

25. The composition according to claim 24, wherein the organic acid comprises citric acid.

26. The composition according to claim 20, wherein the sulfite reducing agent is capable of dilution to a working concentration of from about 0.5 wt. % to about 2 wt. % of sulfite reducing agent in a solubilized form.

27. The composition according to claim 26, wherein the sulfite reducing agent comprises from about 0.5 wt. % to about 2 wt. % sodium metabisulfite.

28. The composition according to claim 20, wherein the sulfite reducing agent is capable of dilution to a working concentration of from about 0.5 wt. % to about 2 wt. % soluble sulfite reducing agent present in solubilized form.

29. The composition according to claim 20, wherein the sulfite reducing agent comprises from about 0.5 wt. % to about 2 wt. % sodium hydrosulfite.

30. The composition according to claim 20, wherein the sodium metabisulfite and sodium hydrosulfite are capable of dilution to a working concentration of about 0.5 wt. % to about 2 wt. % sulfite reducing agent in solubilized form.

31. The composition according to claim 20, comprising from about 0.5 wt. % to about 2 wt. % sodium metabisulfite and sodium hydrosulfite.

* * * * *